(12) United States Patent
Nguyen et al.

(10) Patent No.: US 7,216,711 B2
(45) Date of Patent: May 15, 2007

(54) METHODS OF COATING RESIN AND BLENDING RESIN-COATED PROPPANT

(75) Inventors: Philip D. Nguyen, Duncan, OK (US); Jimmie D. Weaver, Duncan, OK (US); Bhadra D. Desai, Duncan, OK (US)

(73) Assignee: Halliburton Eenrgy Services, Inc., Duncan, OK (US)

( * ) Notice: Subject to any disclaimer, the term of this patent is extended or adjusted under 35 U.S.C. 154(b) by 343 days.

(21) Appl. No.: 10/868,593

(22) Filed: Jun. 15, 2004

(65) Prior Publication Data

US 2004/0221992 A1  Nov. 11, 2004

Related U.S. Application Data

(63) Continuation-in-part of application No. 10/407,643, filed on Apr. 4, 2003, now Pat. No. 6,962,200, which is a continuation-in-part of application No. 10/041, 142, filed on Jan. 8, 2002, now Pat. No. 6,668,926, and a continuation-in-part of application No. 10/163, 185, filed on Jun. 4, 2002, now abandoned, and a continuation-in-part of application No. 10/183,200, filed on Jun. 26, 2002, now Pat. No. 6,729,404, and a continuation-in-part of application No. 10/260,888, filed on Sep. 30, 2002, now Pat. No. 6,725,931.

(51) Int. Cl.
*E21B 43/08* (2006.01)

(52) U.S. Cl. ................... 166/308.1; 166/280.2

(58) Field of Classification Search ............ 166/308.1, 166/280.1, 280.2
See application file for complete search history.

(56) References Cited

U.S. PATENT DOCUMENTS 2,238,671 A  4/1941  Woodhouse .................. 166/21

(Continued)

FOREIGN PATENT DOCUMENTS

CA  2063877  5/2003

(Continued)

OTHER PUBLICATIONS

U.S. Appl. No. 10/383,154, filed Mar. 6, 2003, Nguyen et al.

(Continued)

*Primary Examiner*—William P. Neuder
(74) *Attorney, Agent, or Firm*—Robert A. Kent; Baker Botts

(57) ABSTRACT

A method of consolidating particulates comprising providing a slurry comprising a carrier fluid, a first portion of particulates, and a second portion of particulates wherein the first portion of particulates is at least partially coated with resin or tackifying agent and wherein the second portion of particulates is substantially free of resin or tackifying agent; introducing the slurry into a portion of a subterranean formation such that the first portion of particulates and second portion of particulates to form a particulate pack in the portion of the subterranean formation; and, allowing the resin to substantially consolidate the particulate pack. A particulate slurry for use in subterranean formations comprising a carrier fluid, a first portion of particulates, and a second portion of particulates wherein the first portion of particulates is at least partially coated with resin or tackifying agent and wherein the second portion of particulates is substantially free of resin or tackifying agent.

56 Claims, 1 Drawing Sheet

U.S. PATENT DOCUMENTS

| | | | |
|---|---|---|---|
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,659,651 A | 5/1972 | Graham | 166/280 |
| 3,681,287 A | 8/1972 | Brown et al. | 260/67 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 C |
| 4,074,760 A | 2/1978 | Copeland et al. | 166/276 |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstoesser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis et al. | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutta et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Csabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 528/354 |
| 5,249,628 A | 10/1993 | Surjaatmadia | 166/305 |
| 5,256,729 A | 10/1993 | Kutta et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |

| Patent | Date | Inventor | Class |
|---|---|---|---|
| 5,363,916 A | 11/1994 | Himes et al. | 166/276 |
| 5,373,901 A | 12/1994 | Norman et al. | 166/300 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Suries et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Surles et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constien | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/219 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Surles | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/280 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser et al. | 166/270 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 257/789 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,187,839 B1 | 2/2001 | Eoff et al. | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,279,652 B1 | 8/2001 | Chatterji et al. | 166/194 |

| Patent No. | Date | Inventor | Class |
|---|---|---|---|
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,917 B2 | 12/2001 | Chatterji et al. | 166/295 |
| 6,350,309 B2 | 2/2002 | Chatterji et al. | 106/677 |
| 6,357,527 B1 | 3/2002 | Norman et al. | 166/300 |
| 6,364,945 B1 | 4/2002 | Chatterji et al. | 106/677 |
| 6,367,549 B1 | 4/2002 | Chatterji et al. | 166/292 |
| 6,372,678 B1 | 4/2002 | Youngman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B2 | 6/2002 | Davidson et al. | 166/249 |
| 6,406,789 B1* | 6/2002 | McDaniel et al. | 428/402 |
| 6,408,943 B1 | 6/2002 | Schultz et al. | 166/285 |
| 6,422,314 B1 | 7/2002 | Todd et al. | 166/312 |
| 6,439,310 B1 | 8/2002 | Scott, III et al. | 166/308 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,593,402 B2 | 7/2003 | Chatterji et al. | 524/7 |
| 6,616,320 B2 | 9/2003 | Huber et al. | 366/156.2 |
| 6,648,501 B2 | 11/2003 | Huber et al. | 366/301 |
| 6,664,343 B2 | 12/2003 | Narisawa et al. | 525/474 |
| 6,667,279 B1 | 12/2003 | Hessert et al. | 507/225 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,725,926 B2 | 4/2004 | Nguyen et al. | 166/254.1 |
| 6,732,800 B2 | 5/2004 | Acock et al. | 166/308 |
| 6,745,159 B1 | 6/2004 | Todd et al. | 703/10 |
| 6,763,888 B1 | 7/2004 | Harris et al. | 166/305.1 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/279 |
| 6,866,099 B2* | 3/2005 | Nguyen | 166/308.1 |
| 6,887,834 B2 | 5/2005 | Nguyen et al. | 507/221 |
| 6,978,836 B2 | 12/2005 | Nguyen et al. | 166/295 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0188766 A1 | 10/2003 | Banerjee et al. | 134/7 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/278 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0045326 A1 | 3/2005 | Nguyen | 166/278 |
| 2005/0263283 A1* | 12/2005 | Nguyen | 166/281 |
| 2005/0274517 A1* | 12/2005 | Blauch et al. | 166/280.2 |

FOREIGN PATENT DOCUMENTS

| | | |
|---|---|---|
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0 864 726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1362978 A1 | 11/2003 |
| EP | 1 394 355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2382143 A | 4/2001 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 93/15127 | 8/2003 |
| WO | WO 04/037946 A1 | 5/2004 |
| WO | WO 04/038176 A1 | 5/2004 |
| WO | WO 05/021928 A2 | 3/2005 |

OTHER PUBLICATIONS

U.S. Appl. No. 10/394,898, filed Mar. 21, 2003, Eoff et al.
U.S. Appl. No. 10/408,800, filed Apr. 7, 2003, Nguyen et al.
U.S. Appl. No. 10/601,407, filed Jun. 23, 2003, Byrd et al.
U.S. Appl. No. 10/603,492, filed Jun. 25, 2003, Nguyen et al.
U.S. Appl. No. 10/649,029, filed Aug. 27, 2003, Nguyen et al.
U.S. Appl. No. 10/650,063, filed Aug. 26, 2003, Nguyen et al.

U.S. Appl. No. 10/650,064, filed Aug. 26, 2003, Nguyen et al.
U.S. Appl. No. 10/650,065, filed Aug. 26, 2003, Nguyen.
U.S. Appl. No. 10/659,574, filed Sep. 10, 2003, Nguyen et al.
U.S. Appl. No. 10/727,365, filed Dec. 4, 2003, Reddy et al.
U.S. Appl. No. 10/751,593, filed Jan. 5, 2004, Nguyen et al.
U.S. Appl. No. 10/775,347, filed Feb. 10, 2004, Nguyen et al.
U.S. Appl. No. 10/791,944, filed Mar. 3, 2004, Nguyen et al.
U.S. Appl. No. 10/793,711, filed Mar. 5, 2004, Nguyen et al.
U.S. Appl. No. 10/852,811, filed May 25, 2004, Nguyen et al.
U.S. Appl. No. 10/853,879, filed May 26, 2004, Nguyen et al.
U.S. Appl. No. 10/860,951, filed Jun. 4, 2004, Stegent et al.
U.S. Appl. No. 10/861,829, filed Jun. 4, 2004, Stegent et al.
U.S. Appl. No. 10/862,986, filed Jun. 8, 2004, Nguyen et al.
U.S. Appl. No. 10/868,593, filed Jun. 15, 2004, Nguyen et al.
U.S. Appl. No. 10/868,608, filed Jun. 15, 2004, Nguyen et al.
U.S. Appl. No. 10/944,973, filed Sep. 20, 2004, Nguyen et al.
U.S. Appl. No. 10/972,648, filed Oct. 25, 2004, Dusterhoft et al.
U.S. Appl. No. 10/977,673, filed Oct. 29, 2004, Nguyen et al.
U.S. Appl. No. 11/009,277, filed Dec. 8, 2004, Welton et al.
U.S. Appl. No. 11/011,394, filed Dec. 12, 2004, Nguyen et al.
U.S. Appl. No. 11/035,833, filed Jan. 14, 2005, Nguyen et al.
U.S. Appl. No. 11/049,252, filed Feb. 2, 2005, Van Batenburg et al.
U.S. Appl. No. 11/053,280, filed Feb. 8, 2005, Nguyen et al.
U.S. Appl. No. 11/056,635, filed Feb. 11, 2005, Dusterhoft et al.
Halliburton, *CoalStim$^{SM}$ Service, Helps Boost Cash Flow From CBM Assets*, Stimulation, HO3679 Oct. 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.
Halliburton Technical Flier—Multi Stage Frac Completion Methods, 2 pages.
Halliburton "*CobraFrac$^{SM}$ Service, Coiled Tubing Fracturing—Cost-Effective Method for Stimulating Untapped Reserves*", 2 pages, 2004.
Halliburton "*CobraJetFrac$^{SM}$ Service, Cost-Effective Technology That Can Help Reduce Cost per BOE Produced, Shorten Cycle time and Reduce Capex*".
Halliburton Cobra Frac Advertisement, 2001.
Halliburton "*SurgiFrac$^{SM}$ Service, a Quick and cost-Effective Method to Help Boost Production From Openhole Horizonal Completions*", 2002.
Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.
Almond et al., *Factors Affecting Proppant Flowback With Resin Coated Proppants*, SPE 30096, pp. 171-186, May 1995.
Nguyen et al., *A Novel Approach For Enhancing Proppant Consolidation: Laboratory Testing And Field Applications*, SPE Paper No. 77748, 2002.
SPE 15547, *Field Application of Lignosulfonate Gels To Reduce Channeling*, South Swan Hills Miscible Unit, Alberta, Canada, by O. R. Wagner et al., 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines For Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*" edited by A.-C. Alberston, 2001.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, pp. 658-663, 2001.
Yin et al., "*Preparation and Characterization of Substituted Polyactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Highly Effective In Level 1 Dual-Lateral Completion*" SPE 78697, 2002.
Albertsson et al., "*Aliphatic Polyesters: Synthesis, Properties and Applications*", Advances in Polymer Science, vol. 57 Degradable Aliphatic Polyesters, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications*", SPE 80236, 2003.
*Chelating Agents*, Encyclopedia of Chemical Technology, vol. 5 (764-795).
Vichaibun et al., "*A New Assay for the Enzymatic Degradation of Polylactic Acid, Short Report*", ScienceAsia, vol. 29, pp. 297-300.
CDX Gas, CDX Solution, 2003, CDX, LLC, Available @ www.cdxgas.com/solution.html, printed pp. 1-2.
CDX Gas, "*What is Coalbed Methane?*" CDX, LLC. Available @ www.cdxgas.com/what.html, printed p. 1.
Halliburton brochure entitled "H2Zero™ Service Introducing The Next Generation of cost-Effective Conformance Control Solutions", 2002.
Halliburton brochure entitled INJECTROL® A Component: 1999.
Halliburton brochure entitled "INJECTROL® G Sealant", 1999.
Halliburton brochure entitlled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.
Foreign search report and opinion (CPW 21582 EP), Mar. 11, 2005.

* cited by examiner

METHODS OF COATING RESIN AND BLENDING RESIN-COATED PROPPANT

CROSS-REFERENCE TO RELATED APPLICATIONS

This application is a continuation-in-part of U.S. application Ser. No. 10/407,643, filed Apr. 4, 2003 now U.S. Pat. No. 6,962,200 which is a Continuation-In-Part of U.S. application Ser. No. 10/041,142 filed on Jan. 8, 2002 now U.S. Pat. No. 6,668,926 and of U.S. application Ser. No. 10/163,185 filed on Jun. 4, 2002, now abandoned, and of U.S. application Ser. No. 10/183,200 filed on Jun. 26, 2002 now U.S. Pat. No. 6,729,404 and of U.S. application Ser. No. 10/260,888 filed on Sep. 30, 2002 now U.S. Pat. No. 6,725,931.

BACKGROUND

The present invention relates to methods and compositions for consolidating particulates in subterranean formations. More particularly, the present invention relates to methods of coating particulates with consolidating agents and blending consolidating agent-coated particulates.

Subterranean operations often use particulates coated with consolidating agents such as tackifying agents and/or resins. One example of a production stimulation operation using coated particulates is hydraulic fracturing, wherein a formation is treated to increase its permeability by hydraulically fracturing the formation to create or enhance one or more cracks or "fractures." In most cases, a hydraulic fracturing treatment involves pumping a proppant-free, viscous fluid (known as a pad fluid) into a subterranean formation faster than the fluid can escape into the formation so that the pressure in the formation rises and the formation breaks, creating an artificial fracture or enlarging a natural fracture. Then a proppant is generally added to the fluid to form a slurry that is pumped into the fracture to prevent the fracture from closing when the pumping pressure is released. A portion of the proppant may be coated with a tackifying agent, inter alia, to prevent fines from migrating into the proppant pack. A portion of the proppant may also be coated with curable resin so that, once cured, the placed proppant forms a consolidated mass and prevents the proppant from flowing back during production of the well.

An example of a well completion operation using a treating fluid containing coated particulates is gravel packing. Gravel packing treatments are used, inter alia, to reduce the migration of unconsolidated formation particulates into the well bore. In gravel packing operations, particles known in the art as gravel are carried to a well bore by a hydrocarbon or water carrier fluid. That is, the particulates are suspended in a carrier fluid, which may be viscosified, and the carrier fluid is pumped into a well bore in which the gravel pack is to be placed. The carrier fluid leaks off into the subterranean zone and/or is returned to the surface while the particulates are left in the zone. The resultant gravel pack acts as a filter to separate formation sands from produced fluids while permitting the produced fluids to flow into the well bore. A portion of the gravel may be coated with resin or tackifying agent, inter alia, to further help control the migration of formation fines. Typically, gravel pack operations involve placing a gravel pack screen in the well bore and packing the surrounding annulus between the screen and the well bore with gravel designed to prevent the passage of formation sands through the pack. The gravel pack screen is generally a type of filter assembly used to support and retain the gravel placed during the gravel pack operation. A wide range of sizes and screen configurations are available to suit the characteristics of a particular well bore, the production fluid, and the subterranean formation sands. When installing the gravel pack, the gravel is carried to the formation in the form of a slurry by mixing the gravel with a viscosified carrier fluid. Once the gravel is placed in the well bore, the viscosity of the carrier fluid is reduced, and it is returned to the surface. Such gravel packs may be used to stabilize the formation while causing minimal impairment to well productivity. The gravel, inter alia, acts to prevent formation sands from occluding the screen or migrating with the produced fluids, and the screen, inter alia, acts to prevent the gravel from entering the well bore.

In some situations the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

SUMMARY OF THE INVENTION

The present invention relates to methods and compositions for consolidating particulates in subterranean formations. More particularly, the present invention relates to methods of coating particulates with consolidating agents and blending consolidating agent-coated particulates.

Some embodiments of the present invention provide methods of consolidating particulates comprising providing a slurry comprising a carrier fluid, a first portion of particulates, and a second portion of particulates wherein the first portion of particulates is at least partially coated with resin and wherein the second portion of particulates is substantially free of resin; introducing the slurry into a portion of a subterranean formation such that the first portion of particulates and second portion of particulates form a particulate pack in the portion of the subterranean formation; and, allowing the resin to substantially consolidate the particulate pack.

Other embodiments of the present invention provide methods of consolidating particulates comprising providing a slurry comprising a carrier fluid, a first portion of particulates, and a second portion of particulates wherein the first portion of particulates is at least partially coated with tackifying agent and wherein the second portion of particulates is substantially free of tackifying agent; introducing the slurry into a portion of a subterranean formation such that the first portion of particulates and second portion of particulates form a particulate pack in the portion of the subterranean formation; and, allowing the tackifying agent to substantially consolidate the particulate pack.

Other embodiments of the present invention provide particulate slurries for use in subterranean formations comprising a carrier fluid, a first portion of particulates, and a second portion of particulates wherein the first portion of particulates is at least partially coated with resin and wherein the second portion of particulates is substantially free of resin.

Other embodiments of the present invention provide particulate slurries for use in subterranean formations comprising a carrier fluid, a first portion of particulates, and a second portion of particulates wherein the first portion of particulates is at least partially coated with tackifying agent and wherein the second portion of particulates is substantially free of tackifying agent.

The features of the present invention will be readily apparent to those skilled in the art upon a reading of the description of the preferred embodiments that follows.

DESCRIPTION OF PREFERRED EMBODIMENTS

Figure 1:
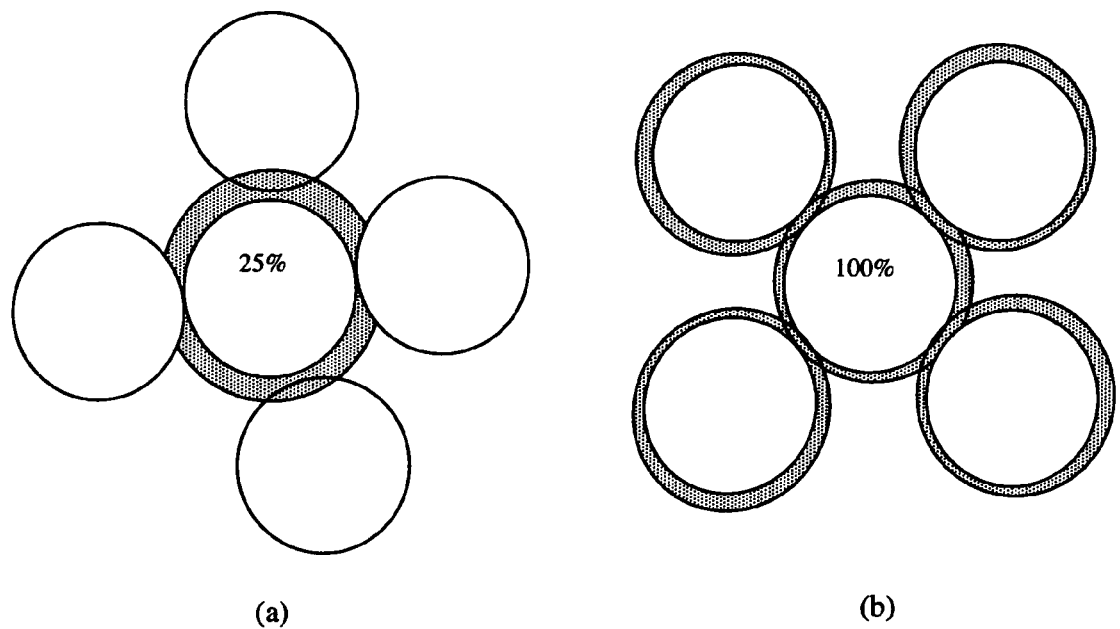
FIG. 1 illustrates a stylized view of the distinction between a traditional resin coating (b) and the resin coatings of the present invention (a).

The present invention relates to methods and compositions for consolidating particulates in subterranean formations. More particularly, the present invention relates to methods of coating particulates with consolidating agents and blending consolidating agent-coated particulates.

While it has been previously believed that in order to achieve strong, solid, conductive particulate packs it was necessary to coat as great a percentage of the particulates as possible, we have found that it is actually more beneficial to coat only a portion of the particulates, but to coat more heavily that portion with a relatively larger weight percentage of consolidating agent than has been previously used. By using a substantially homogeneous mixture of relatively heavily coated particulates and uncoated particulates to create a particulate pack, particular embodiments of the methods of the present invention offer economical approaches to coating particulates with resin while maintaining or enhancing the consolidation strength of the particulate pack.

In particular embodiments of the present invention, a first portion of particulates, typically ranging from about 10% to about 60% by weight of the total amount of particulates, is coated with a consolidating agent; then the consolidating agent-coated first portion of particulates is combined with a servicing fluid (such as a fracturing fluid or gravel packing fluid) with the remainder of the (uncoated) particulates (90% to 40% uncoated, depending on the percentage of consolidating agent-coated proppant). The mixing of the consolidating agent-coated and uncoated particulates in the servicing fluid allows the coated particulates to be distributed among the uncoated particulates. In certain embodiments, the resin consolidating agent-coated and uncoated particulates are substantially uniformly intermingled in the servicing fluid. When introduced into a subterranean fracture, the mixture of coated and uncoated particulates cures to form a particulate pack that may exhibit a consolidation strength equivalent to, and often even higher than, a traditional particulate pack comprised entirely of coated particulates.

Contributing to this enhanced consolidation strength is the fact that particular embodiments of the present invention use coated particulates that feature a thicker coating of consolidating agent than those found in traditional subterranean applications. For example, in traditional applications, consolidating agent-coated particulates are normally coated with a consolidating agent in an amount in the range of 3% to 5% by weight of the particulates. However, in particular embodiments of the present invention, the particulates used may be coated with a consolidating agent in an amount of at least about 5%, or in the range of from about 5.5% to about 50% by weight of the particulates. In other embodiments, the particulates used may be coated with a consolidating agent in an amount of at least about 7%. In other embodiments, the particulates used may be coated with a consolidating agent in an amount of at least about 10%. In other embodiments, the particulates used may be coated with a consolidating agent in an amount of at least about 15%. In accordance with certain methods of the present invention, one method of achieving such greater coatings of consolidating agent without greatly increasing costs is to use the same amount of consolidating agent that would be used to coat an entire batch of particulates in a traditional subterranean application, but use that amount of consolidating agent to coat only a fraction of the total amount of particulates.

The greater coating of consolidating agent on the first (coated) portion of the particulates may have numerous benefits. By coating only a portion of the particulates with this greater coating, more consolidating agent is concentrated at the contact points between the grains of particulates. This may allow the consolidating agent to build stronger grain-to-grain adhesions. Additionally, it is believed that the thicker coating of consolidating agent on the particulate may help to create larger interstitial spaces between the individual particulates. These larger interstitial spaces, or voids, may help enhance the conductivity of the particulate packs without reducing their consolidation strength. A stylized view of the distinction between the traditional consolidating agent coating and the consolidating agent coatings of the present invention is provided in FIG. 1. FIG. 1(a) illustrates a situation wherein only about 20–25% of the particulates is coated with consolidating agent, but that percentage is coated with a relatively greater coating of consolidating agent. FIG. 1(b) illustrates a situation wherein about 90–100% of the particulates are coated with a traditional thickness coating of consolidating agent. In FIGS. 1(a) and 1(b), the same amount of consolidating agent has been used to coat, but in FIG. 1(a) all of the consolidating agent is on one particulate while in FIG. 1(b) the resin is spread among five particulates.

The methods of the present invention may be used, inter alia, such that the total volume of consolidating agent used is less than that traditionally needed to effect good consolidation, thus resulting in a direct cost decrease due to the use of less consolidating agent. Alternatively, as described above, the methods of the present invention may use the same amount of consolidating agent coated on a smaller portion of the particulates, in that case while a direct cost benefit of reduced consolidating agent usage may not be seen, cost savings may still occur due to the fact that coating fewer particulates may result in simplified operating procedures, reduced horsepower requirement, and reduced equipment usage. It is within the ability of one skilled in the art to determine the minimum level of consolidation needed for a job and to select the level of consolidating agent accordingly. For example, when using curable resins, consolidation strengths (when considered in terms term of unconfined compressive strengths, UCC) may range from about 20 psi to 2,000 psi, depending on the resin concentration, cure time, and cure temperature.

Particulates used in accordance with the present invention are generally of a size such that formation sands that may migrate with produced fluids are prevented from being produced from the subterranean zone. Any suitable proppant or gravel may be used, including, but not limited to, graded sand, bauxite, ceramic materials, glass materials, walnut hulls, nut shells, polymer beads, and the like. Generally, the particulates have a size in the range of from about 4 to about 400 mesh, U.S. Sieve Series. In some embodiments of the present invention, the particulates are graded sand having a particle size in the range of from about 10 to about 70 mesh, U.S. Sieve Series.

As mentioned above, in accordance with the preferred methods of the present invention, only a portion of the total amount of proppant is coated with consolidating agent. In certain particular embodiments of the present invention, the particulates may be purchases as pre-coated from a commercial supplier (RCP). Suitable commercially available RCP materials include, but are not limited to, pre-cured resin-coated sand, curable resin-coated sand, curable resin-coated ceramics, single-coat, dual-coat, or multi-coat resin-coated sand, ceramic, or bauxite. Some examples available from Borden Chemical, Columbus, Ohio, are "XRT™ CERAMAX P," "CERAMAX I," "CERAMAX P," "ACFRAC BLACK," "ACFRAC CR," "ACFRAC SBC," "ACFRAC SC," and "ACFRAC LTC." Some examples available from Santrol, Fresno, Tex., are "HYPERPROP G2," "DYNAPROP G2," "MAGNAPROP G2," "OPTIPROP G2," "SUPER HS," "SUPER DC," "SUPER LC," and "SUPER HT." Typically, these products come from the supplier with a coating of resin in an amount in the range of about 3% to about 5% by weight of the proppant. However, as mentioned above, embodiments of the present invention generally employ a greater coating of than traditional RCP materials may be coated with consolidating agent in an amount of at least about 5%, or in the range of from about 5.5% to about 50% by weight of the particulates. In other embodiments, the particulates used may be coated with a consolidating agent in an amount of at least about 7%. In other embodiments, the particulates used may be coated with a consolidating agent in an amount of at least about 10%. In other embodiments, the particulates used may be coated with a consolidating agent in an amount of at least about 15%.

One suitable type of consolidating agent is a resin. Suitable resin compositions include those resins that are capable of forming a hardened, consolidated mass. Suitable resins include, but are not limited to, two-component epoxy-based resins, novolak resins, polyepoxide resins, phenol-aldehyde resins, urea-aldehyde resins, urethane resins, phenolic resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be of the two-component variety mentioned above and use an external catalyst or activator. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. Selection of a suitable resin coating material may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin also may be suitable. It is within the ability of one skilled in the art, with the benefit of this disclosure, to select a suitable resin for use in embodiments of the present invention and to determine whether a catalyst is required to trigger curing.

As mentioned above, particular embodiments of the present invention may employ an activator, or external catalyst, to trigger the curing of certain resin compositions, for example, two-component epoxy resins. In an exemplary embodiment, such an activator may be delivered by at least partially coating the non-resin-coated portion of the particulates with the activator prior to mixing the two portions of particulates together. Once mixed with the resin-coated particulates, the activator may trigger the curing of the resin, facilitating the consolidation of the particulates. When applied to the non-resin-coated portion of the particulates, the activator is typically present in an amount in the range of from about 0.01% to about 25% by weight of the particulates. Activators suitable for use in accordance with the present invention may depend on the resin employed in a particular embodiment. Examples of suitable activators include an alcohol; a ketone; an ester; an ether; an amide; benzene sulfonic acid; sulfuric acid; methane sulfonic acid; trichloroacetic acid; hydrochloric acid; hydrofluoric acid; ferric chloride; toluene sulfonic acid; chlorobenzene sulfonic acid; nitric acid; perchloric acid; a water soluble multivalent metal salt catalyst comprising at least one multivalent ion of either manganese, zinc, cadmium, magnesium, cobalt, nickel, copper, tin, iron, lead, or calcium; and combinations thereof. With the benefit of this disclosure, it is within the ability of one skilled in the art to select an activator appropriate for use with a selected resin, should an activator be necessary, and the amount necessary to trigger curing.

Similarly, particular embodiments of the present invention may also employ a curing agent to facilitate the curing of the resin. In an exemplary embodiment, such a curing agent may be delivered by at least partially coating the non-resin-coated portion of the particulates with the curing agent prior to mixing the two portions of particulates together. Once mixed with the coated particulates, the curing agent may facilitate the curing of the resin, and therefore the consolidation of the particulates. When applied to the non-resin-coated portion of the particulates, the curing agent is typically present in an amount in the range of from about 0.01% to about 25% by weight of the particulates. Curing agents suitable for use in accordance with the present invention may depend on the resin employed in a particular embodiment. Examples of suitable curing agents include amines, polyamines, amides, polyamides, hexachloroacetone, 1,1,3-trichlorotrifluoroacetone, benzotrichloride, benzylchloride, benzalchloride, 4,4'-diaminodiphenyl sulfone, and combinations thereof. With the benefit of this disclosure, it is within the ability of one skilled in the art to select a curing agent appropriate for use with a selected resin, should a curing agent be necessary, and the amount necessary to trigger curing.

In particular embodiments of the present invention, the consolidating agent may be a tackifying agent. In other embodiments, the consolidating agent may be a combination of resin and tackifying agent. When used in conjunction with resin coated particulates, a tackifying agent is typically applied after the application of the resin in an amount of from about 2% to about 10% by weight of the particulates. When used in place of a resin, the tackifying agent is typically present in an amount of from about 5% to about 25% by weight of the particulates.

Compositions suitable for use as tackifying agents in accordance with the present invention comprise any compound that, when in liquid form or in a solvent solution, will form a non-hardening coating upon a particulate. In particular embodiments, tackifying agents may include polyamides that are liquids or in solution at the temperature of the subterranean formation such that they are, by themselves, non-hardening when introduced into the subterranean formation. One such compound is a condensation reaction product comprised of commercially available polyacids and a polyamine. Such commercial products include compounds such as mixtures of $C_{36}$ dibasic acids containing some trimer and higher oligomers and also small amounts of monomer acids produced from fatty acids, maleic anhydride, and acrylic acid, and the like. Such acid compounds are commercially available from companies such as Witco Corporation, Union Camp, Chemtall, and Emery Industries. The reaction products are available from, for example, Champion Technologies, Inc., and Witco Corporation. Additional compounds that may be used as tackifying agents include liquids and solutions of, for example, polyesters, polycarbonates and polycarbamates, natural resins such as shellac, and the like. Suitable tackifying agents are described in U.S. Pat. No. 5,853,048 issued to Weaver, et al., and U.S. Pat. No. 5,833,000 issued to Weaver, et al., the relevant disclosures of which are herein incorporated by reference.

Tackifying agents suitable for use in the present invention may be either used such that they form non-hardening coating or they may be combined with a multifunctional material capable of reacting with the tackifying compound to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde-releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01% to about 50% by weight of the tackifying compound to effect formation of the reaction product. In some preferable embodiments, the compound is present in an amount of from about 0.5% to about 1% by weight of the tackifying compound. Suitable multifunctional materials are described in U.S. Pat. No. 5,839,510 issued to Weaver, et al., the relevant disclosure of which is herein incorporated by reference.

The tackifying agent may act, inter alia, to enhance the grain-grain contact between individual particulates. Moreover, the tackifying agent may soften any previously-applied, partially cured resin on the particulates. This dual action of the tackifying agent may improve the final consolidation strength of a particulate pack made in accordance with the present invention.

Any servicing fluid suitable for a subterranean application may be used in accordance with the teachings of the present invention, including aqueous gels, emulsions, and other suitable fracturing fluids. Suitable aqueous gels are generally comprised of water and one or more gelling agents. Suitable emulsions may be invert or regular and may be comprised of two immiscible liquids such as an aqueous gelled liquid and a liquefied, normally gaseous fluid, such as nitrogen. In certain exemplary embodiments of the present invention, the servicing fluids are aqueous gels comprised of water, a gelling agent for gelling the water and increasing its viscosity, and, optionally, a cross-linking agent for cross-linking the gel and further increasing the viscosity of the fluid. The increased viscosity of the gelled, or gelled and cross-linked, fracturing fluid, inter alia, reduces fluid loss and allows the fracturing fluid to transport significant quantities of suspended proppant particles.

To facilitate a better understanding of the present invention, the following examples of preferred embodiments are given. In no way should the following examples be read to limit or define the scope of the invention.

EXAMPLES

Example 1

Four 250-gram samples of 20/40-mesh size bauxite proppant were coated with a total of 7.8 cc of high-temperature epoxy resin. The samples were coated such that in each sample a different portion of the sample was coated with the resin (e.g., 100%, 75%, 50%, and 25%). Each resin-coated proppant sample was then poured into a cross-linking gel carrier fluid while the fluid was stirred at high speed using an overhead stirrer. After 10 seconds of high speed stirring, the proppant slurries were stirred at very low speed to stimulate the effect of pumping and suspending the proppant slurries in fractures during hydraulic fracturing treatments. Each proppant slurry was then poured into a brass chamber, packed, and cured at 325° F. for 20 hours. After curing, the consolidated cores were obtained, cut into size, and unconfined compressive strengths were determined for each sample composition. These unconfined compressive strengths are shown in Table 1, in which:

sample composition No. 1 contains 250 grams of proppant coated with a total of 7.8 cc of resin;

sample composition No. 2 contains 250 grams of proppant, 188 grams of which were coated with a total of 7.8 cc of resin;

sample composition No. 3 contains 250 grams of proppant, 125 grams of which were coated with a total of 7.8 cc of resin; and sample composition No. 4 contains 250 grams of proppant, 62 grams of which were coated with a total of 7.8 cc of resin.

TABLE 1

| Proppant | Unconfined Compressive Strength (psi) |
|---|---|
| Sample Composition No. 1 | 480 |
| Sample Composition No. 2 | 565 |
| Sample Composition No. 3 | 580 |
| Sample Composition No. 4 | 545 |

From Table 1, it is evident that the unconfined compressive strengths of the sample compositions were higher when only a portion of the sample had been coated with resin.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of consolidating particulates comprising:
providing a slurry comprising a substantially homogeneous mixture of a carrier fluid, a first portion of particulates, and a second portion of particulates wherein the first portion of particulates is at least partially coated with resin and wherein the second portion of particulates is substantially free of resin;
introducing the slurry into a portion of a subterranean formation such that the first portion of particulates and second portion of particulates form a particulate pack in the portion of the subterranean formation; and,
allowing the resin to substantially consolidate the particulate pack.

2. The method of claim 1, wherein the portion of the subterranean formation comprises a portion of a fracture or a portion of an annulus surrounding a well bore.

3. The method of claim 1, wherein the resin comprises at least one component chosen from an epoxy-based resin, a novolak resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a polyester resin, a polyurethane resin, an acrylate resin, and a combination thereof.

4. The method of claim 1, wherein the first portion of particulates comprises between about 10% and about 60%, by weight of the combined weight of the first and second portions of particulates.

5. The method of claim 1, wherein the resin is present in an amount in the range of from about 5% to about 50% by weight of the first portion of particulates.

6. The method of claim 1, wherein the resin comprises a curable resin.

7. The method of claim 1, wherein the resin comprises a non-curable resin.

8. The method of claim 1, wherein the first portion of particulates is at least partially coated with a tackifying agent.

9. The method of claim 8, wherein the tackifying agent is present in an amount in the range of from about 2% to about 7% by weight of the first portion of particulates.

10. The method of claim 8, wherein the tackifying agent comprises at least one component chosen from a polyamide, a polyester, a polycarbonate, a polycarbamate, a natural resin, and a combination thereof.

11. The method of claim 8, wherein the first portion of the particulates is at least partially coated with a multifunctional material.

12. The method of claim 11, wherein the multifunctional material comprises at least one component chosen from an aldehyde, a hemiacetal, an aldehyde-releasing compound, a diacid halide, a dihalide, a polyacid anhydride, an epoxide, a furfuraldehyde, a glutaraldehyde, an aldehyde condensate, and a combination thereof.

13. The method of claim 11, wherein the multifunctional material is present in an amount in the range of from about 0.01% to about 50% by weight of the tackifying agent.

14. The method of claim 11, wherein the multifunctional material is present in an amount in the range of from about 0.1% to about 1% by weight of the tackifying agent.

15. The method of claim 1, wherein the second portion of particulates is at least partially coated with an activator.

16. The method of claim 15, wherein the activator is present in an amount in the range of from about 0.01% to about 25% by weight of the second portion of particulates.

17. The method of claim 15, wherein the activator comprises at least one component chosen from an alcohol; a ketone; an ester; an ether; an amide; benzene sulfonic acid; sulfuric acid; methane sulfonic acid; trichloroacetic acid; hydrochloric acid; hydrofluoric acid; ferric chloride; toluene sulfonic acid; chlorobenzene sulfonic acid; nitric acid; perchloric acid; a water soluble multivalent metal salt catalyst comprising at least one multivalent ion of either manganese, zinc, cadmium, magnesium, cobalt, nickel, copper, tin, iron, lead, or calcium; and a combination thereof.

18. The method of claim 1, wherein the second portion of particulates is at least partially coated with an curing agent.

19. The method of claim 18, wherein the curing agent is present in an amount in the range of from about 0.01% to about 25% by weight of the second portion of particulates.

20. The method of claim 18, wherein the curing agent comprises at least one component chosen from an amine, a polyamine, an amide, a polyamide, hexachloroacetone, 1,1,3 -trichlorotrifluoroacetone, benzotrichloride, benzylchloride, benzalchloride, 4,4'-diaminodiphenyl sulfone, and a combination thereof.

21. A method of consolidating particulates comprising:
providing a slurry comprising a substantially homogeneous mixture of a carrier fluid, a first portion of particulates, and a second portion of particulates wherein the first portion of particulates is at least partially coated with tackifying agent and wherein the second portion of particulates is substantially free of tackifying agent;
introducing the slurry into a portion of a subterranean formation such that the first portion of particulates and second portion of particulates form a particulate pack in the portion of the subterranean formation; and,
allowing the tackifying agent to substantially consolidate the particulate pack.

22. The method of claim 21, wherein the portion of the subterranean formation comprises a portion of a fracture or a portion of an annulus surrounding a well bore.

23. The method of claim 21, wherein the first portion of particulates comprises between about 10% and about 60%, by weight, of the combined weight of the first and second portions of particulates.

24. The method of claim 21, wherein the tackifying agent is present in an amount in the range of about 5% to about 10% by weight of the first portion of particulates.

25. The method of claim 21, wherein the tackifying agent comprises at least one component chosen from a polyamide, polyester, polycarbonate, polycarbamate, a natural resin, and a combination thereof.

26. The method of claim 21, wherein the first portion of particulates is at least partially coated with a multifunctional material.

27. The method of claim 26, wherein the multifunctional material comprises at least one component chosen from an aldehyde, a hemiacetal, an aldehyde-releasing compound, a diacid halide, a dihalide, a polyacid anhydride, an epoxide, a furfuraldehyde, a glutaraldehyde, an aldehyde condensate, and a combination thereof.

28. The method of claim 26, wherein the multifunctional material is present in an amount in the range of from about 0.01% to about 50% by weight of the tackifying agent.

29. The method of claim 26, wherein the multifunctional material is present in an amount in the range of from about 0.1% to about 1% by weight of the tackifying agent.

30. A particulate slurry for use in subterranean formations comprising a substantially homogeneous mixture of a carrier fluid, a first portion of particulates, and a second portion of particulates wherein the first portion of particulates is at least partially coated with resin and wherein the second portion of particulates is substantially free of resin.

31. The particulate slurry of claim 30, wherein the resin comprises at least one component chosen from an epoxy-based resin, a novolak resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a polyester resin, a polyurethane resin, an acrylate resin, and a combination thereof.

32. The particulate slurry of claim 30, wherein the first portion of particulates comprises between about 10% and about 60%, by weight of the combined weight of the first and second portions of particulates.

33. The particulate slurry of claim 30, wherein the resin is present in an amount in the range of about 5% to about 50% by weight of the first portion of particulates.

34. The particulate slurry of claim 30, wherein the resin comprises a curable resin.

35. The particulate slurry of claim 30, wherein the resin comprises a non-curable resin.

36. The particulate slurry of claim 30, wherein the first portion of particulates is at least partially coated with a tackifying agent.

37. The particulate slurry of claim 36, wherein the tackifying agent is present in an amount in the range of from about 2% to about 7% by weight of the first portion of particulates.

38. The particulate slurry of claim 36, wherein the tackifying agent comprises at least one component chosen from a polyamide, polyester, polycarbonate, polycarbamate, a natural resin, and a combination thereof.

39. The particulate slurry of claim 36, wherein the particulate slurry further comprises a multifunctional material.

40. The particulate slurry of claim 39, wherein the multifunctional material comprises at least one component chosen from an aldehyde, a hemiacetal, an aldehyde-releasing compound, a diacid halide, a dihalide, a polyacid anhydride, an epoxide, a furfuraldehyde, a glutaraldehyde, an aldehyde condensate, and a combination thereof.

41. The particulate slurry of claim 39, wherein the multifunctional material is present in an amount in the range of from about 0.01% to about 50% by weight of the tackifying agent.

42. The particulate slurry of claim 39, wherein the multifunctional material is present in an amount in the range of from about 0.1% to about 1% by weight of the tackifying agent.

43. The particulate slurry of claim 30, wherein the second portion of particulates is at least partially coated with an activator.

44. The particulate slurry of claim 43, wherein the activator is present in an amount in the range of from about 0.01% to about 25% by weight of the second portion of particulates.

45. The particulate slurry of claim 43, wherein the activator comprises at least one component chosen from an alcohol; a ketone; an ester; an ether; an amide; benzene sulfonic acid; sulfuric acid; methane sulfonic acid; trichloroacetic acid; hydrochloric acid; hydrofluoric acid; ferric chloride; toluene sulfonic acid; chlorobenzene sulfonic acid; nitric acid; perchloric acid; a water soluble multivalent metal salt catalyst comprising at least one multivalent ion of either manganese, zinc, cadmium, magnesium, cobalt, nickel, copper, tin, iron, lead, or calcium; and a combination thereof.

46. The particulate slurry of claim 30, wherein the second portion of particulates is at least partially coated with a curing agent.

47. The particulate slurry of claim 46, wherein the curing agent is present in an amount in the range of from about 0.01% to about 25% by weight of the second portion of particulates.

48. The particulate slurry of claim 46, wherein the curing agent comprises at least one component chosen from an amine, a polyamine, an amide, a polyamide, hexachloroacetone, 1,1,3-trichlorotrifluoroacetone, benzotrichloride, benzylchloride, benzalchloride, 4,4'-diaminodiphenyl sulfone, and a combination thereof.

49. A particulate slurry for use in subterranean formations comprising a substantially homogeneous mixture of a carrier fluid, a first portion of particulates, and a second portion of particulates wherein the first portion of particulates is at least partially coated with tackifying agent and wherein the second portion of particulates is substantially free of tackifying agent.

50. The particulate slurry of claim 49, wherein the first portion of particulates comprises between about 10% and about 60%, by weight of the combined weight of the first and second portions of particulates.

51. The particulate slurry of claim 49, wherein the tackifying agent is present in an amount in the range of about 5% to about 10% by weight of the first portion of particulates.

52. The particulate slurry of claim 49, wherein the tackifying agent comprises at least one component chosen from a polyamide, a polyester, a polycarbonate, a polycarbamate, a natural resin, and a combination thereof.

53. The particulate slurry of claim 49, wherein the proppant slurry further comprises a multifunctional material.

54. The particulate slurry of claim 53, wherein the multifunctional material comprises at least one component chosen from an aldehyde, a hemiacetal, an aldehyde-releasing compound, a diacid halide, a dihalide, a polyacid anhydride, an epoxide, a furfuraldehyde, a glutaraldehyde, an aldehyde condensate, and a combination thereof.

55. The particulate slurry of claim 53, wherein the multifunctional material is present in an amount in the range of from about 0.01% to about 50% by weight of the tackifying agent.

56. The particulate slurry of claim 53, wherein the multifunctional material is present in an amount in the range of from about 0.1% to about 1% by weight of the tackifying agent.

* * * * *